W. B. BULL.
METHOD OF PURIFYING WATER.
APPLICATION FILED MAY 31, 1910.
982,704.
Patented Jan. 24, 1911.
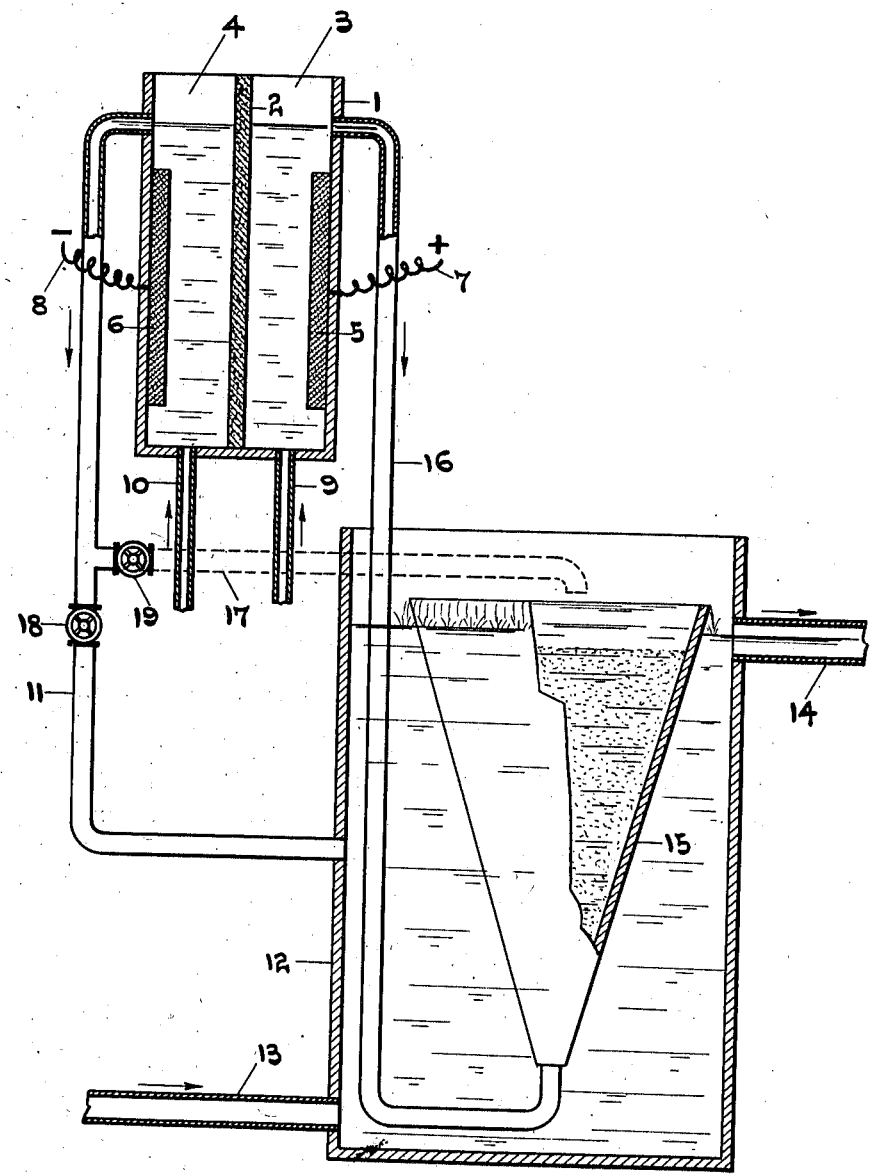
WITNESSES
INVENTOR
William B. Bull,
BY
ATTORNEYS.

UNITED STATES PATENT OFFICE.

WILLIAM B. BULL, OF CHICAGO, ILLINOIS, ASSIGNOR TO CHLORIDE PROCESS COMPANY, OF CHICAGO, ILLINOIS, A CORPORATION OF ILLINOIS.

METHOD OF PURIFYING WATER.

982,704.  Specification of Letters Patent.  Patented Jan. 24, 1911.

Application filed May 31, 1910. Serial No. 564,245.

*To all whom it may concern:*

Be it known that I, WILLIAM B. BULL, a citizen of the United States, residing at Chicago, in the county of Cook and State of Illinois, have invented a new and useful Method of Purifying Water, of which the following is a specification, reference being had to the accompanying drawings.

My invention relates to the purification of water for potable and other industrial uses, and it has particularly to do with the purification of water in large quantities by treating the water with a suitable coagulant adapted to agglomerate or cause a coalescence of the impurities in the water and afterward removing the coagulated matter by sedimentation or by filtration through a granular filter-bed.

The object of my invention is to provide a new and improved method of treatment which will be so economical as to be commercially practicable, and in which it will not be necessary to use slaked lime or lime-water.

Some of the methods which have heretofore been most generally used, and particularly within the last few years, have comprised the introduction into the water to be purified of a suitable soluble metallic salt, such as ferrous sulfate, and the precipitation of the iron in the form of a hydrate by the use of slaked lime or lime-water. While the results obtained by this method are very satisfactory so far as the removal of the impurities contained in the water is concerned, the use of the lime solution has been followed with very serious consequences due to the fact that the lime is deposited upon pipes, valves and fittings and in the filter-bed so that the efficiency of the plant is soon very considerably reduced and ultimately is practically destroyed. My improved process is free from this objection and besides may be practiced much more economically than the iron process described.

It consists in producing by electrolysis a solution which is a solvent of iron, subjecting iron in a separate chamber to the action of such solution to form a solution of an iron compound, precipitating the iron solution in the form of an hydroxid coagulant, and then coagulating the impurities in the water by the use of such coagulant. It also contemplates the formation by the electrolytic action of an alkaline hydrate, and the use of such hydrate in forming the hydroxid coagulant, although in some cases the coagulant may be formed by the action of the precipitant naturally contained in the water.

In its best form my invention contemplates the precipitation of the coagulant in the water to be purified, but if this is not done the precipitation of the coagulant should be effected so shortly before its introduction into the water to be purified that its agglomeration would take place in such water.

In the accompanying drawings, which illustrate a simple form of apparatus for practicing my process, the figure is substantially a central vertical section.

Referring to the drawings,—1 indicates a suitable receptacle, which is divided by a porous diaphragm 2 into anode and cathode compartments 3, 4.

5, 6 indicate electrodes of which the positive or anode is of carbon or other suitable material chemically inert so far as chlorin is concerned, which are placed in the two compartments 3, 4, respectively, and are connected to conductors 7, 8 by which the electric current is supplied.

9, 10 indicate inlet pipes communicating, respectively, with the bottom of the chambers 3, 4. A solution of common salt is placed in compartment 4 and the other compartment is filled with water which at the beginning of the operation may be acidulated, or otherwise treated, if desired, to increase its conductivity. With the passage of the electric current through the wires 7, 8 the electrode 5 becomes the anode and the electrode 6 the cathode of an electrolytic apparatus, the result being the decomposition of the common salt solution in the compartment 4, forming a solution of sodium hydrate therein and the formation of a solution containing chlorin in the compartment 3. While the operation is in progress the supply of water and sodium chlorid in the two compartments 3, 4, is maintained through pipes 9, 10.

11 indicates a pipe leading from the upper portion of compartment 4 to a tank 12 through which the water to be purified is passed, such water being admitted to the bottom of the tank through an inlet pipe 13.

14 indicates an outlet pipe communicating with the tank 12 near the upper portion thereof and at the opposite side from the inlet pipe 13 so that the water to be purified flows through said tank in an upward direction.

15 indicates a funnel-shaped receptacle, which is placed in the tank 12 and with its upper margin below the upper edge of said tank so that the overflow from the solution passing upward through such receptacle, as hereinafter described, is discharged into said tank. The receptacle 15 is adapted to contain comminuted iron or its equivalent and is connected at its lower end by a pipe 16 with the upper portion of the chamber 3, the arrangement being such that the overflow from said chamber 3 passes down to the bottom of the receptacle 15 and then upward through said receptacle, overflowing its upper edge as illustrated in the drawings. It will be apparent that by this construction the iron solvent formed in the chamber 3 will be conducted to the bottom of the receptacle 15 and will rise through the mass of iron in said receptacle, thereby thoroughly subjecting the particles of iron therein to the action of the solution. The result is the formation of a strong solution of chlorid of iron which is discharged into the water to be purified passing through the tank 12.

If the water to be purified does not contain sufficient free carbonic acid gas to interfere with the natural oxidation of the iron solution and prevent its precipitation as iron hydrate, the use of the sodium hydrate formed in chamber 4 as a precipitant is not necessary, but ordinarily it is desirable to use it, and in such case the solution of sodium hydrate may be conducted directly into the water to be purified through pipe 11, or, if preferred, the solution of sodium hydrate may be discharged into the upper portion of the receptacle 15 through a pipe 17 indicated by dotted lines in the drawings. In the latter arrangement the sodium hydrate is introduced directly into the solution of chlorid of iron before the latter is discharged into the water to be purified, but, as will be observed, such discharge will take place immediately after the introduction of the sodium hydrate into the chlorid of iron solution. Valves 18, 19 are provided for controlling the point of discharge of the sodium hydrate solution. In either case the agglomeration of the precipitated iron hydrate takes place in the water to be purified, thus enabling it to coagulate the impurities so that they may be readily removed by subsequent filtration or sedimentation.

It will be understood that my invention includes equivalents for the substances named.

I am aware that it has heretofore been proposed to purify sewage by a process involving the production in the mass of sewage to be purified of chlorid of iron and an alkaline hydrate by electrolysis, using an anode of iron or other material capable of entering into chemical combination with some constituent of the electrolyte, but my invention differs radically from said process. According to the prior process referred to the entire mass of sewage is electrolyzed, necessitating the use of an electric current of many times greater voltage, because of its lower conductivity due to its state of dilution, than is required in my process, in which the electrolyte is insignificant in volume as compared with the volume of water to be purified, and consequently I am able to economically employ as the electrolyte a solution the conductivity of which is so great that a current of low voltage may be successfully employed, and this without injuriously affecting the water to be purified.

So far as I am aware, I am the first in the art to devise a process of water purification consisting in forming a solvent of iron and a precipitant of chlorid of iron simultaneously by electrolysis, treating iron in a separate chamber with the solvent so formed, and then treating the water to be purified with the unagglomerated coagulant derived by precipitation from the iron solution so formed, either with or without the use of the electrolytically formed precipitant referred to. And I also believe myself to be the first in the art to produce a coagulant suitable for use in water purification by electrolyzing a saline solution, using a chemically inert anode, thereby generating a solvent of iron and an alkaline hydrate solution, separately subjecting iron to the action of such solvent, and then treating the resulting solution with the alkaline hydrate.

The solution produced by the electrolytic action described is a solvent of iron and by its action upon the iron forms an iron salt solution which is precipitable as an hydroxid coagulant, such precipitation being in some cases effected by the action of the substances naturally contained in the water treated and in other cases by the addition of a suitable precipitant, such as the alkaline hydrate formed as hereinbefore described.

The term "chemically inert" as applied to the anode is used to indicate only that the anode is not chemically acted upon by the element liberated at the positive electrode, and does not mean that it must be made of a material that will resist chemical action in other situations.

That which I claim as my invention, and desire to secure by Letters Patent, is,—

1. The method of purifying water, which consists in producing by electrolysis a solution which is a solvent of iron, subjecting iron in a separate chamber to the action of such solution to form a solution of an iron compound, precipitating the iron solution in the form of an hydroxid coagulant, and coagulating the impurities in the water to be purified with such coagulant.

2. The method of purifying water, which consists in producing by electrolysis a solution which is a solvent of iron, subjecting iron in a separate chamber to the action of such solution to form a solution of an iron compound, precipitating the iron solution in the form of an hydroxid coagulant, and subjecting the impurities in the water to be treated to the action of such coagulant before it has been agglomerated.

3. The method of purifying water, which consists in producing by electrolysis an alkaline hydrate solution and a solution which is a solvent of iron, subjecting iron in a separate chamber to the action of the latter solution to form a solution of an iron compound, and precipitating the iron solution in the form of an hydroxid coagulant by means of the alkaline hydrate solution, and coagulating the impurities in the water to be purified with such coagulant.

4. The method of purifying water, which consists in producing by electrolysis a solution which is a solvent of iron, subjecting iron in a separate chamber to the action of the latter solution to form a solution of an iron compound, and then introducing the iron solution so formed into the water to be purified.

5. The method of purifying water, which consists in producing by electrolysis a solution of caustic soda and a solution which is a solvent of iron, subjecting iron in a separate chamber to the action of the latter solution to form a solution of an iron compound, and then introducing the iron solution so formed into the water to be purified and precipitating the iron by the use of the soda solution.

6. The method of purifying water, which consists in producing by electrolysis an alkaline hydrate solution and a solution which is a solvent of iron, subjecting iron in a separate chamber to the action of the latter solution to form a solution of an iron compound, and introducing the iron solution so formed into the water to be purified, and precipitating an hydroxid coagulant therein by means of the alkaline hydrate solution.

7. The method of purifying water, which consists in electrolyzing a saline solution, thereby generating a solution which is a solvent of iron, separately subjecting iron to the action of the latter solution to form a solution of an iron compound, and then treating the water to be purified with said iron solution.

8. The method of purifying water, which consists in electrolyzing a saline solution, thereby generating a solution which is a solvent of iron, separately subjecting iron to the action of the latter solution to form a solution of an iron compound, and then precipitating the iron solution in the form of an hydroxid coagulant, and coagulating the impurities in the water to be purified with such coagulant.

9. The method of purifying water, which consists in electrolyzing a saline solution in a divided cell, separately subjecting iron to the action of the solution formed at the anode to form a solution of an iron compound, precipitating the iron solution in the form of an hydroxid coagulant, and coagulating the impurities in the water to be purified with such coagulant.

WILLIAM B. BULL.

Witnesses:
JOHN L. JACKSON,
MINNIE A. HUNTER.